UNITED STATES PATENT OFFICE.

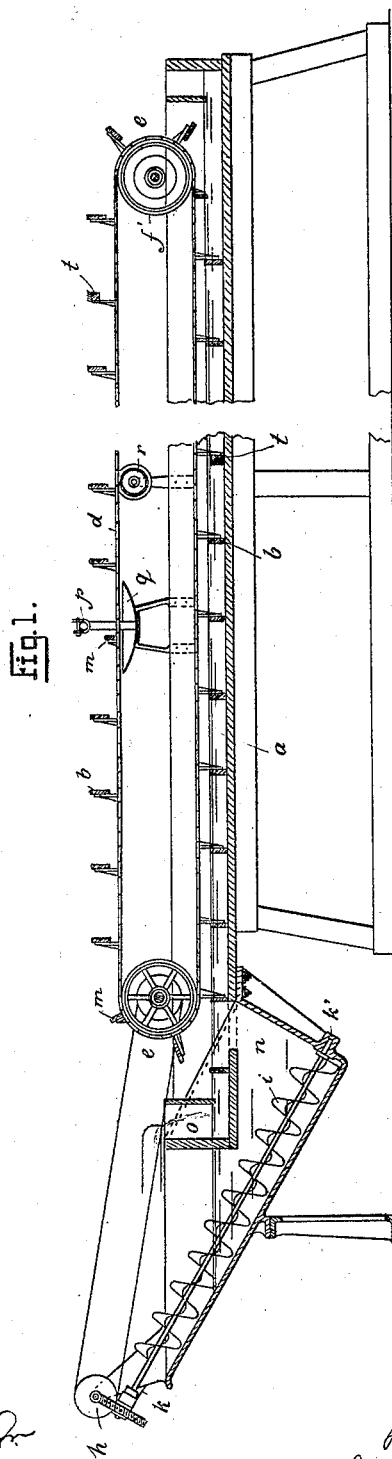

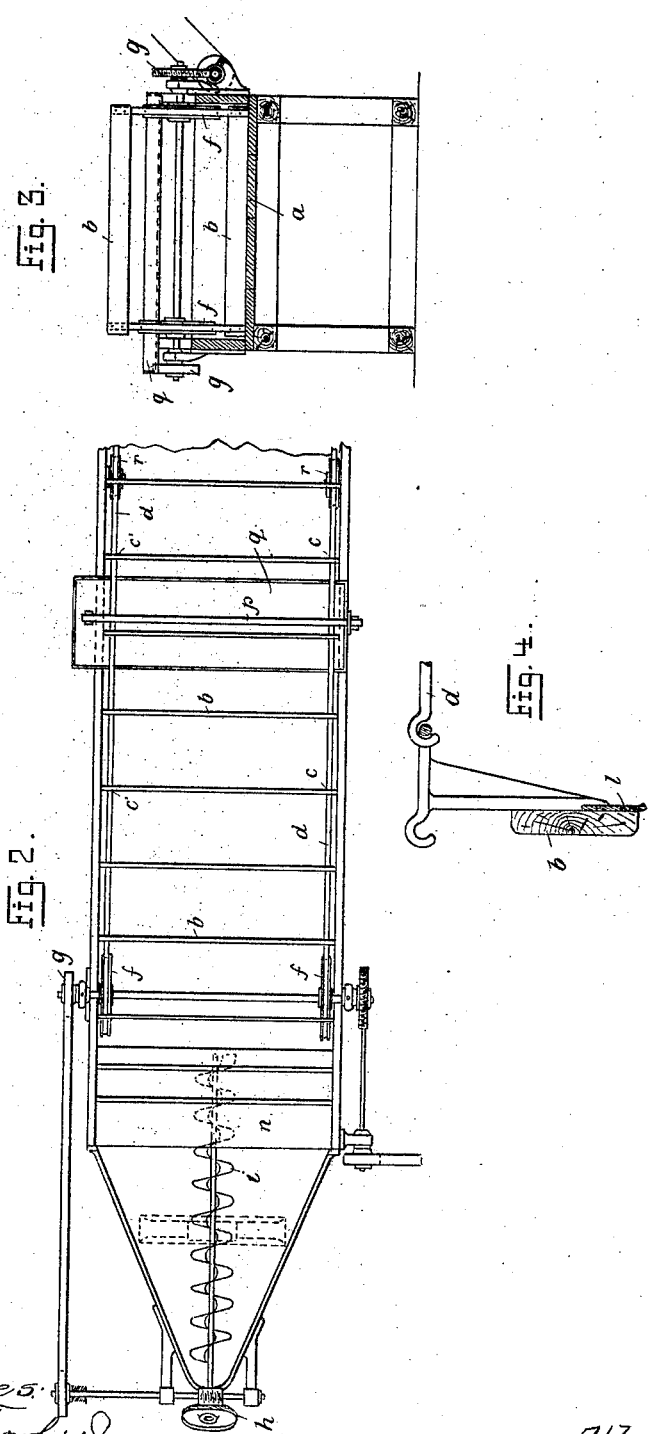

ALBERT ÅBERG, OF HERMAGOR, AUSTRIA-HUNGARY.

APPARATUS FOR PURIFYING PAPER-PULP.

SPECIFICATION forming part of Letters Patent No. 691,091, dated January 14, 1902.

Application filed March 23, 1901. Serial No. 52,564. (No model.)

*To all whom it may concern:*

Be it known that I, ALBERT ÅBERG, manager of the paper-mill in Hermagor, Duchy of Carinthia, Empire of Austria-Hungary, have invented certain Improvements in or Relating to Apparatus for Use in Purifying Paper-Pulp and the Like, of which the following is a specification.

The material employed in the manufacture of paper and the like contains, even after the most careful preparation, impurities—such as small particles of sand, coal, metal fragments, knots, and other particles of higher specific gravity than the pulp—all of which must be removed before the material can be allowed to undergo further treatment. For this purpose a so-called "sand-trap" is generally used, consisting of a shallow trough, on the bottom of which are stationary laths or baffle-plates, which project above the bottom of the trough and form pockets, in which the waste material is caught. Such a sand-trap has a slight inclination, and the material passing over it naturally tends to flow over the bottom of the trough, and the impurities, being heavier than the pulp, will pass along the bottom and are intercepted by the said laths and collected in the dead-corners which they form at the bottom of the trough—*i. e.*, in the angles not affected by the current. It may at once be stated that this means of removing the impurities from the material does not always correspond to the expectations based on theoretical deductions, since a uniform density of the material, a condition which is rarely obtained, is of the greatest importance in such a process. Such sand-traps are therefore very inefficient in many cases and do more harm than good, owing to the irregularities and consequent delays caused by the accumulation of impurities, stoppages and changes in the flow of the material, and the like. A further drawback of these sand-traps as used at present is the great loss of material, which cannot be avoided, whenever the trough is emptied and cleaned. The manipulation and working of these sand-traps also require a great amount of time, which renders the employment of them still more expensive. In order to remedy these drawbacks, the present invention has been devised, according to which the sand-laths or baffle-plates are movably arranged and are given a movement contrary to that of the material treated and in the course of which the impurities are mechanically removed.

An apparatus according to this invention is represented in the accompanying drawings, in which—

Figure 1 is a longitudinal vertical section. Fig. 2 is a plan view of part of the machine; Fig. 3, a cross-section thereof, and Fig. 4 is a cross-section of a lath.

The apparatus comprises a shallow trough $a$, similar to those used at present as sand-traps. $b$ indicates the baffle-plates, connected at both ends $c\ c'$ to the links of an endless chain $d$ (or cord or the like) and so arranged that they successively enter the trough and pass along it and in contact with the bottom, strips of leather, rubber, or the like being secured to the lower edge of the plates for this purpose, as represented in Fig. 4. The chains $d$ pass around rotatorily-arranged pulleys $f\ f'$ at the ends $e\ e$ of the trough and actuated by a suitably-arranged worm-gear or cord-drum or other system of gearing. In front of the bottom of the trough is a deep recess $n$, acting as a collector or receiver and provided with a worm conveyer $i$, rotating in bearings $k\ k'$ and driven by a suitable worm-gear $h$ or otherwise. The said worm conveyer may also be arranged parallel with the longitudinal side of the trough or perpendicular to it instead of obliquely, as shown. In a similar manner a second series of baffle-plates $m$ are connected with the chain or cord, which, however, are so arranged that they do not extend into the liquid in the manner of the baffle-plates $b$. In a similar manner a series of brushes $t$ are connected with the chain. These brushes serve to clean the bottom of the trough.

$p$ indicates a transverse sprayer, $q$ a scum receiver or gutter, and $r$ guide-rollers to support the chains.

The method of working is as follows: The apparatus having been set in motion, the paper-pulp or similar fibrous material is admitted at $o$. As soon as the level reaches above the bottom the fluid begins to flow against the baffle-plates $b$, which move in the opposite direction and by their constant and uniform movement sweep all impurities accumulating at the bottom of the trough against the stream of the material into the recess or collector n, whence the impurities are mechanically removed by the rotating worm conveyer i. Between the movably-arranged baffle-plates b are arranged at intervals foam or scum laths m, moving in the same direction with them—i. e., against the flow of the material. These laths only slightly dip into the material, and their purpose is to remove the foam or scum forming on the top of the fluid and carry it on them. The sprayer p sprays upon them as they pass and removes the scum into the gutter q, whence it is removed. In the case of long troughs the chains or cables or the like are supported by guide-rollers r. In this manner all impurities—such as sand, limestone fragments, knots, and the like, as well as the scum forming on the top of the fluid pulp—are not only removed, but by means of the brushes fastened to the chains even the smallest particles of foreign material are swept off the bottom toward the collector n, whereby the trough is kept thoroughly clean and the formation of any slime is prevented.

Having now particularly described and ascertained the nature of this invention and in what manner the same is to be performed, I declare that what I claim is—

1. An apparatus for purifying paper-pulp and the like, comprising a trough and a communicating collector, means for introducing the material adjacent to the collector, a series of cross baffle-plates, and means whereby said baffle-plates may be caused to move in a direction contrary to the flow of the material.

2. An apparatus for purifying paper-pulp and the like, comprising a trough and a collector, means for introducing the material, a series of cross baffle-plates resting on the bottom of said trough, intermediate scum-removing laths, and means whereby said baffle-plates may be caused to move in a direction contrary to the flow of the material.

3. An apparatus for purifying paper-pulp and the like, comprising a trough and a communicating collector, means for introducing the material adjacent to the collector, a series of cross baffle-plates, endless chains supporting said baffle-plates, pulleys supporting said chains, and means for rotating said pulleys, whereby said baffle-plates may be caused to move in a direction contrary to the flow of the material.

4. An apparatus for purifying paper-pulp and the like, comprising a trough and a collector, means for introducing the material, a series of cross baffle-plates, intermediate scum-removing baffle-plates, endless chains supporting said baffle-plates, pulleys supporting said endless chains, and means for rotating said pulleys, whereby said baffle-plates may be caused to move in a direction contrary to the flow of the material.

5. An apparatus for purifying paper-pulp and the like, comprising a trough and a collector, means for introducing the material, a series of cross baffle-plates, intermediate brushes resting on the bottom of said trough, and means whereby said baffle-plates and brushes may be caused to move in a direction contrary to the flow of the material.

6. An apparatus for purifying paper-pulp and the like, comprising a trough and a collector, means for introducing the material, a series of cross baffle-plates, and intermediate brushes resting on the bottom of said trough, intermediate scum-removing baffle-plates, and means whereby said baffle-plates and brushes may be caused to move in a direction contrary to the flow of the material.

7. An apparatus for purifying paper-pulp and the like, comprising a trough and a collector communicating, means for introducing the material adjacent to the collector, a series of cross baffle-plates, a spray-pipe and a receiving-gutter, and means whereby said baffle-plates may be caused to move in a direction contrary to the flow of the material.

8. An apparatus for purifying paper-pulp and the like, comprising a trough and a collector, means for introducing the material, a series of cross baffle-plates resting on the bottom of said trough, intermediate scum-removing laths, a spray-pipe and a receiving-gutter, and means whereby said baffle-plates may be caused to move in a direction contrary to the flow of the material.

In testimony that I claim the foregoing as my invention I have signed my name in presence of two subscribing witnesses.

ALBERT ÅBERG.

Witnesses:
ADOLF FISCHER,
HENRY SCHOEN.